Feb. 1, 1966 T. LAMPART 3,233,100
DETERMINING PRESENCE OF AEROSOLS IN CASES
Filed Dec. 20, 1962 3 Sheets-Sheet 2
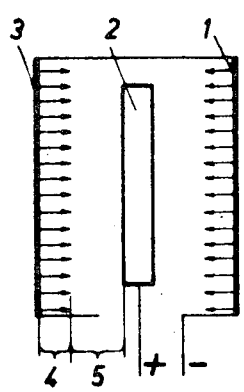
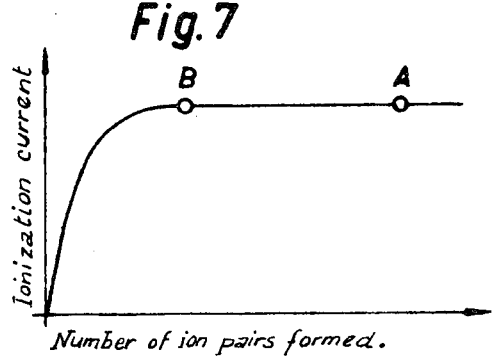
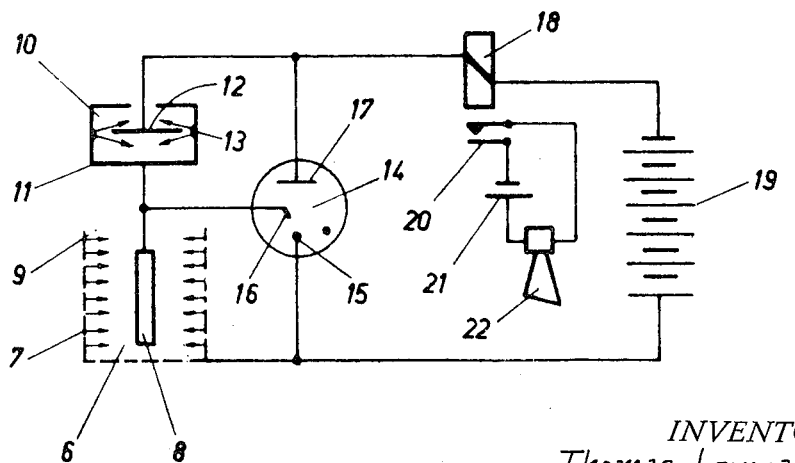
INVENTOR.
Thomas Lampart
BY
Cushman, Darby & Cushman
ATTORNEYS Feb. 1, 1966     T. LAMPART     3,233,100
DETERMINING PRESENCE OF AEROSOLS IN CASES
Filed Dec. 20, 1962     3 Sheets-Sheet 3
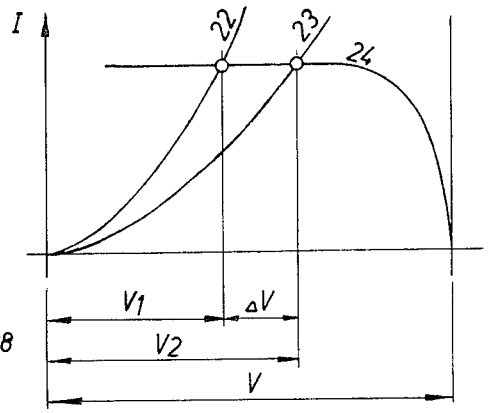
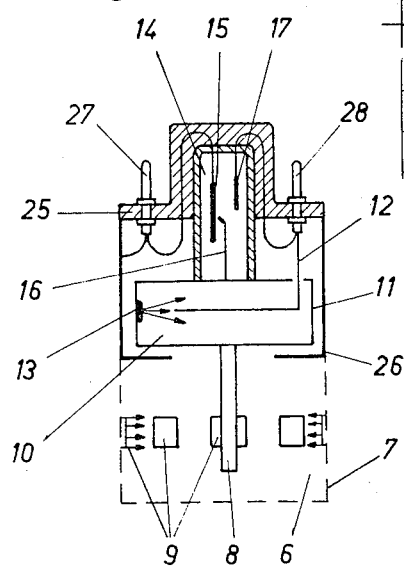
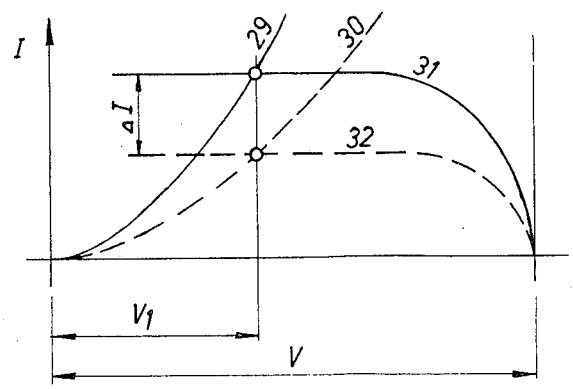
INVENTOR.
Thomas Lampart
BY
Cushman, Darby & Cushman
ATTORNEYS

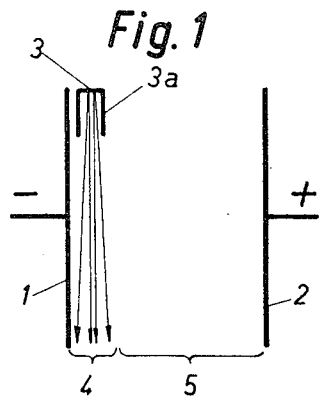
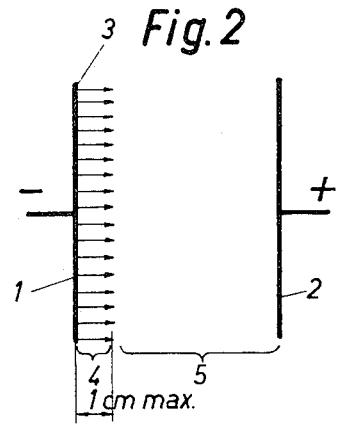
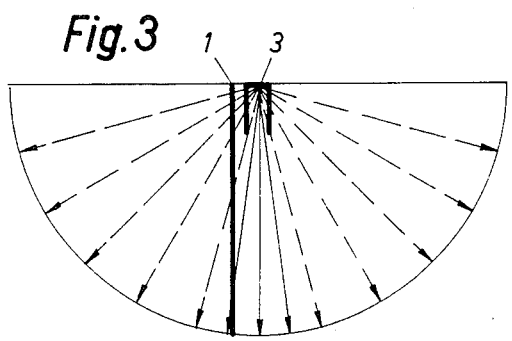
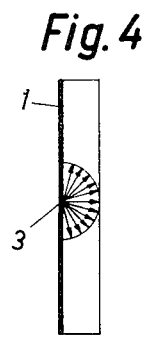
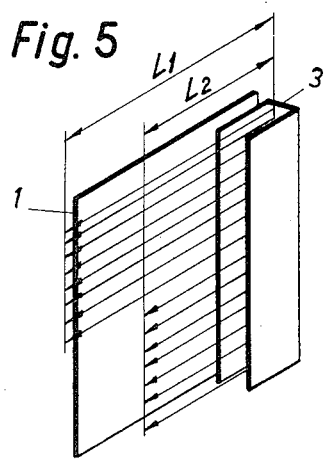
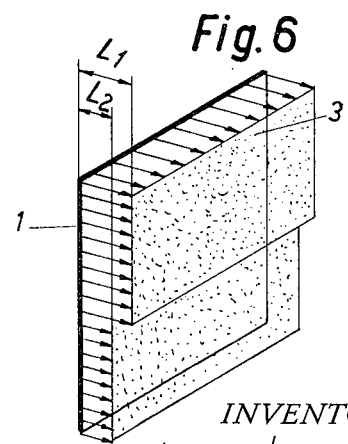

United States Patent Office 3,233,100
Patented Feb. 1, 1966

3,233,100
DETERMINING PRESENCE OF AEROSOLS
IN GASES
Thomas Lampart, Mannedorf, Switzerland, assignor to Cerberus AG., Mannedorf, Switzerland, a corporation of Switzerland
Filed Dec. 20, 1962, Ser. No. 246,152
Claims priority, application Switzerland, Jan. 10, 1962, 269/62
6 Claims. (Cl. 250—44)

This invention relates to a process and apparatus and system for determining the presence of aerosols in gases. For the purpose of the present specification, the term "aerosol" shall be deemed to mean particles of sub-microscopic to microscopic magnitude suspended in gases, e.g., in air. Aerosols are produced by way of example, in many chemical reactions such as most combustion processes. The method and the device according to this invention are, therefore, suitable for the determination of smoke and combustion gases, and in particular for automatic fire alarms.

Generally speaking, in the space between two electrodes, charge carriers are produced by means of at least one source of radioactive radiation through ionization, and between the electrodes constant electrostatic field is maintained, and the change of the ionic current flowing between the electrodes, caused by aerosols getting into the space, is measured. A process and system of this kind is for example known from the German Patent 1,046,372 and the United States Patent 2,994,768. Therein, in the ionization chamber defined by the two electrodes an ionic current is maintained by a charge carrier of one sign. When aerosols enter this space, the ionic current changes, which is used as an indication of the presence of aerosols. To produce the unipolar current in the ionization chamber, a source of radioactive corpuscular radiation is used, the radius of influence of this radiation lying in the order of magnitude of the distance between the electrodes. The radioactive source has been installed in such a way that the rays run parallel to an electrode in whose range the gas in the chamber is then ionized.

In the prior process mentioned above, however, the use of the radioactive material provided in the radioactive source is not very good. Furthermore, the characteristic of the installation for carrying out the prior process is dependent to a considerable extent on the fading activity, as time goes on, of the radioactive preparation, as well as on the contamination of same, which especially when the installation is used as a fire alarm apparatus, is a great disadvantage. The main purpose of the present invention is to eliminate these drawbacks.

The process according to this invention is characterized by the fact that a radioactive source is used of which the radiation bringing about the ionization has a radius of influence extending from one electrode at most a relatively short distance into the space between electrodes, e.g. less than 1 centimeter from an electrode spaced more than twice that amount from the other electrode.

The invention furthermore relates to apparatus for carrying out this process, which is provided with two electrodes placed in a space to which the gas that is to be examined, has access, and with at least one radioactive source radiating from one electrode for the ionization of the gas in a part of the space. It is characteristic of the installation that the radius of influence of the corpuscular radiation of the radioactive source is effectively less than 1 centimeter.

In the above and following discussion "radius of influence of the corpuscular radiation" means the average radius of influence under normal atmosphere conditions.

Provision of such new process and apparatus, as well as a system incorporating that apparatus for indicating the presence of aerosols in gases, is representative of the objects of this invention. Other objects will become evident from the following description in conjunction with the attached drawings in which:

FIGURE 1 schematically represents apparatus for the determination of aerosols in gases in the way customary before this invention;

FIGURE 2 schematically represents apparatus for determining aerosols in gases, with a radioactive source, the ionizing corpuscular radiation of which has a radius of influence of less than 1 centimeter in accordance with the present invention;

FIGURES 3 and 4 schematically represent a portion of the apparatus of FIGURES 1 and 2, respectively, to explain the distinct use of the radioactive source;

FIGURES 5 and 6 schematically represent a portion of the apparatus of FIGURES 1 adn 2, respectively, to explain the distinctive relations in the case of contamination of the radioactive source;

FIGURE 7 is a graph illustrating the dependence of the ionic current on the activity of the source or the number of pairs of ions formed at a given potential between the electrodes;

FIGURE 8 represents a cylindrical ionization chamber to carry out the process in longitudinal section;

FIGURE 9 schematically represents a simple fire alarm circuit where measuring ionization chamber with a radioactive preparation is used, the radius of influence of the corpuscular radiations therein being less than 1 centimeter;

FIGURE 10 is a voltage-current graph related to the FIGURE 9 circuit of the two ionizing chambers;

FIGURE 11 represents a longitudinal section through a structural representation of the two ionization chambers of the fire alarm circuit of FIGURE 9; and FIGURE 12 represents, graphically, the graphs of the fire alarm of FIGURE 11.

FIGURE 1 shows the layout, in principle, of the electrodes and of the radioactive source of the ionization chamber when using the tools at the level of development of prior technology. Electrodes 1 and 2 have a potential applied to them with the negative pole being connected to electrode 1. The radioactive source 3 ionizes volume 4. In space part 5 there are only negative ions present. The circumscribed ionization is obtained by means of source container 3a screened off and opened only on one side.

FIGURE 2 shows in the same way a sample of how the invention is carried out. The positive electrode is again indicated by 2 and the negative electrode by 1. On negative electrode 1 the radioactive material is placed, as an example, in the form of an evaporated layer 3, the radius of influence of the corpuscular radiation not exceeding more than 1 centimeter. Therefore an ionization only takes place in the part of the space marked 4, whereas, (and this is the same as in the ionization chamber of FIGURE 1) in part 5 of the space no ionization is brought about. As a result of the difference in voltage between electrodes 1 and 2, the negative ions are extracted from part 4 of the space, so that in part 5 of the space practically only negative ions appear which take over the transportation of the charges. Now if aerosols appear between electrodes 1 and 2, these aerosols attach themselves to the negative ions and slow up the transportation and/or reduce the current flowing through the chamber. This change in current is used to indicate the presence of aerosols, as is enlarged on still further below.

By using a radioactive material whose ionizing corpuscular radiation has a radius of influence of less than 1 centimeter, a number of advantages is obtained.

First of all the degree of utilization of the radioactive source used is considerably increased, which, putting it in different words, means that for an equal ionization a smaller amount of radioactive substance is necessary.

As may be seen from FIGURE 1, the circumscribed ionization to produce a unipolar flow is obtained by means of a screening container 3a opened only on one side. As a result most of the beams are absorbed in the screen, and only a small part of same is used for the production of ions. To make this effect clearer, a point of the radiating source is shown in FIGURE 3, where the corpuscles entering freely in the air are represented by arrow lines and those absorbed in the screen by broken lines. For the new FIGURE 2 arrangement the same representation is kept in FIGURE 4. When comparing the two figures the advantage of the improved arrangement with regard to the use of the source becomes evident. Whereas in FIGURE 3 only a narrow semicircular zone can be used for the ionization, the whole radiating semicircle produces usable ions in FIGURE 4.

A further advantage of the ionization chamber of FIGURE 2 is that any unavoidable contamination of the radioactive sources (e.g. in the case of fire alarm apparatus) influences to a less extent the function of the chamber of FIGURE 2 than is the case with the chamber of FIGURE 1.

If dirt should attach itself to the radioactive substance, the radius of influence of the radiation becomes smaller as the thickness of the dirt increases as a result of the loss of kinetic energy of the corpuscles in the first layer. Whereas as a result of this, the ionized area within reach of the electrode decreases according to the shortening of the radius of influence in the well-known arrangement, the ionized area in the new arrangement remains in although the radius of influence of the radiation likewise declines.

The influence of the contamination on the two kinds of ionization has been illustrated in FIGURES 5 and 6. The electrode has again been marked by 1, and L1 indicates the radius of influences of the corpuscles when the source is clean, and L2 the one when the source is dirty.

As may easily be seen, the ionization current is, in the first case, reduced proportionate to the ionized area. This effect cannot be expected unconditionally in the second case, although here too the number of ions formed becomes smaller as a result of the shortened length of radiation. However, in a unipolar ionization chamber (when the ionization is sufficiently rich and when there is a determined electrode potential) the ionization current is independent of the number of pairs of ions formed as a result of the developing space charge.

The saturation effect, now, can be used in such a way that to begin with a stronger ionization is produced than would unconditionally be necessary for the desired current.

FIGURE 7 shows the dependence of the current of the chamber of FIGURE 2 on the activity of the source, the condition when the source is pure being marked by A, and when there is a certain amount of contamination being marked by B. Now, if the ionization chamber is provided with a radiation source showing an activity corresponding to point A, the contamination, as has already been said, does not cause an effect to take place at all up to a determined limit, whereas on the other hand, in the well-known arrangement this effect becomes immediately noticeable in the decline of the ionization current. As is shown in FIGURE 7, the ionization current remains constant when the production of ions is sufficient. This effect, now, can be utilized on the one hand—as mentioned above—for the elimination of the results of the contamination, and besides also to make possible the use of relatively short-lived radiator cells. As may be seen from FIGURE 7, the ionization current does not change when the activity declines from the original value A as compared with B.

If the influence of a decrease in activity and in contamination only ranges within points A and B, no influence on the ionization current can be determined.

As a practical example we may mention the radioactive hydrogen $H^3$ (tritium) with a half-life period of 12 years and a radius of influence of the beta rays of less than 1 centimeter. With a corresponding overdosage the ionization current can be kept constant for any desired length of time. The use of this radiator cell has besides the important practical advantage that only beta rays with a very small energy are emitted. As a result a biological radiation danger, as possible from gamma-radiator cells or alpha radiator cells with gamma components ($Ra^{226}$), is prevented.

This invention is not, however, limited to such radioactive substances of which the natural radius of influence of the corpuscular rays is less than 1 centimeter; since those with a larger radius of influence are suitable if their radius of influence is correspondingly shortened by means of an absorption layer (e.g. precious metal foils) applied to the substance. Therefore, both beta radiator cells (e.g. C14) and alpha radiator cells (e.g. Po 210) are usable.

An appropriate practical application of the unipolar chamber is shown in FIGURE 8. Between pin-shaped electrode 2 and cylinder-electrode 1 concentrically attached to same, is applied a chamber potential which preferably is less than three-fourths the potential to just produce saturation current, for example 120 volts. Radioactive substance 3 has been evenly applied to the inner surface of the mantle of electrode 1. In space 4 there are positive and negative ions; in space 5, on the other hand, only negative ones.

In FIGURE 9, the complete circuit of a fire alarm apparatus with an ionization chamber operating according to this invention is shown. Measuring chamber 6 includes cathode 7 in the form of perforated sheet metal, pin-shaped anode 8 and radioactive source 9 applied evenly to the cathode. Chamber 6 is in series with comparison chamber 10 operating in saturation, which comparison chamber 10 includes cathode 11, anode 12 and radiation source 13. Parallel to these two ionization chambers there is the ionical relay or cold cathode tube 14 with a cathode 15, a regulating electrode 16 and an anode 17. This arrangement is connected across the winding of relay 18 and voltage source 19. Contact 20 of relay 18 is in the circuit of an alarm device, which includes battery 21 and a horn 22. When combustion gases get into ionization chamber 6, the voltage on regulating electrode 16 increases, thus igniting cold cathode tube 14. Then a stronger current flows through the winding of relay 18, so that the alarm circuit is closed by means of contact 20.

FIGURE 10, to illustrate the way of operating, shows the characteristics of the two ionization chambers connected in series. The current voltage graph of the measuring chamber for pure air is indicated by curve 22, and the same graph when there is a certain aerosol concentration by curve 23, while the characteristic 24 of the control chamber is shown with its zero point being on the right in the diagram. V is the potential applied to the two chambers, $V_1$ being the voltage existing over the measuring chamber when the air is pure. When aerosols enter the measuring chamber, the chamber voltage of value $V_1$ increases up to value $V_2$, i.e.. by $\Delta V$ and ignites cold cathode tube 14.

Structure for such an arrangement is shown in greater detail in FIGURE 11. The reference numbers 6 through 17 indicate the same parts in FIGURE 11 as in FIGURE 9. To a pedestal 25 a housing 26 has been attached to surround ionization chamber 10. Also secured to the pedestal is the cold cathode tube 14 which carries ionization chamber 10 by the part which projects downward from pedestal 25. Regulating electrode 16 has been attached to the wall of ionization chamber 10 facing cold cathode tube 14 and projects into the interior of cold cathode tube 14, as shown. A contact pin 27 is connected with cathode 15 and housing 26, and a contact pin 28 connects with anode 17 and electrode 12 of ionization chamber 10. Electrode 12, in this case, is inside of this chamber 10. Ionization chamber 6 has, as an external electrode 7, a perforated hood which can be attached to housing 26. Electrode 8 of chamber 6 projects outwardly from the outside (lower) wall of chamber 10.

As radioactive preparations in the unipolar chamber, foil pieces are used on which $H^3$ is chemically bound in a thin titanium layer. Since in a practical application the theoretically ideal arrangement of the radioactive source (even distribution over the entire electrode area) as per FIGURE 8 cannot be carried out under certain circumstances for technical reasons in connection with the manufacture, the desired dependence between ionization current and number of charge-carriers as per FIGURE 7 becomes somewhat more unfavorable, i.e. the saturation curve does not run so even as indicated. In order to adjust this slight decrease in current, which, as has already been said, is produced by the relatively low half-life period, the idea is for the reference chamber to be provided with a radioactive source, whose half-life period compensates for the current decrease in the measuring chamber. The way it operates is shown in FIGURE 12.

The current voltage characteristic of the measuring chamber at time zero is shown by curve 29, and the same characteristic at a later time X by curve 30. Also shown are the current voltage characteristics of the reference chamber with the zero point on the right hand side of the diagram, curve 31 representing time zero and curve 32 time X.

V is the potential across the two chambers and V1 the voltage across the measuring chamber. The current decrease $\Delta I$ corresponds to the decrease of the activity of the radioactive source of the reference chamber as a result of radioactive disintegration. These measures make it possible to keep value V1, which is responsible for the stability of the fire alarm apparatus, constant and independent of the radioactive disintegration when the ideal arrangement of the radioactive source cannot be completely carried out for practical reasons.

The radiation source of the comparison chamber may also consist of radioactive substances of different half-life periods. This may make it possible to obtain a sufficient compensation also when the radiator cells available have a half-life period which does not correspond exactly to the one required.

What is claimed is:

1. Automatic fire alarm apparatus for determining the presence of incendiary aerosols in a gas comprising means including two spaced electrodes for creating an electrostatic field in the space between said electrodes and providing access into said space for said gas, gas ionization means for causing an ionic current between said electrodes including at least one source of radioactive material disposed to radiate corpuscular radiation from one of said electrodes into said space in a direction parallel to the said electrostatic field and having therein an effective radius of radiation influence less than one centimeter, and means including alarm means coupled to said electrodes for sensing changes in said ionic current due to the presence of incendiary aerosols in the ionized gas and for effecting an alarm in response to such changes.

2. Apparatus as in claim 1 wherein the distance between the said electrodes is greater than double the said radius.

3. Apparatus as in claim 1 wherein the source material is tritium.

4. Apparatus as in claim 1 comprising a measuring ionization chamber including the said gas ionization means and electrostatic field creating means subjectable to said gas and aerosols as aforesaid, a control ionization chamber serially connected to the said measuring chamber, said control chamber being subjectable to said gas free of said aerosols and operable in saturation, said sensing and alarm effecting means including an indicating device connected to said chambers for sensing a change in potential between the said two electrodes of said measuring chamber due to the presence of incendiary aerosols in said space.

5. A system as in claim 4 wherein the said control chamber contains a radioactive radiation source of such a half-life period that a decrease in current in the said measuring chamber resulting from radioactive disintegration, is compensated.

6. A system as in claim 5 wherein the said radioactive radiation source of the control chamber includes radioactive substances of different half-life periods.

References Cited by the Examiner
UNITED STATES PATENTS

| | | | |
|---|---|---|---|
| 2,972,680 | 2/1961 | Hicks et al. | 250—44 |
| 2,994,768 | 8/1961 | Derfler | 250—83.6 X |

RALPH G. NILSON, *Primary Examiner.*

ARCHIE R. BORCHELT, *Examiner.*